(12) United States Patent
Elmore

(10) Patent No.: US 6,584,723 B2
(45) Date of Patent: Jul. 1, 2003

(54) POLE HANDLING APPARATUS

(75) Inventor: James F. Elmore, Andalusia, AL (US)

(73) Assignee: Keeper Manufacturing, Inc., Kinston, AL (US)

( * ) Notice: Subject to any disclaimer, the term of this patent is extended or adjusted under 35 U.S.C. 154(b) by 0 days.

(21) Appl. No.: 09/796,905

(22) Filed: Feb. 28, 2001

(65) Prior Publication Data

US 2002/0116859 A1 Aug. 29, 2002

(51) Int. Cl.$^7$ .............................................. A01K 97/10
(52) U.S. Cl. ............................ 43/4.5; 43/21.2; 248/538
(58) Field of Search .................... 43/21.2, 4.5; 248/534, 248/538, 540

(56) References Cited

U.S. PATENT DOCUMENTS

| | | | | |
|---|---|---|---|---|
| 3,389,489 A | * | 6/1968 | Burns | 43/17 |
| 3,555,719 A | * | 1/1971 | Butler | 43/54.1 |
| 4,106,811 A | * | 8/1978 | Hernandez | 297/188.09 |
| 4,586,688 A | * | 5/1986 | Hartman et al. | 248/538 |
| 4,635,390 A | * | 1/1987 | Walters | 43/21.2 |
| 4,658,533 A | * | 4/1987 | Mendoza | 43/21.2 |
| 4,730,408 A | * | 3/1988 | Miller | 43/15 |
| 5,152,494 A | * | 10/1992 | Frunzar | 248/513 |
| 5,632,112 A | * | 5/1997 | Steinborn | 43/21.2 |

* cited by examiner

Primary Examiner—Kurt Rowan
(74) Attorney, Agent, or Firm—Robert Platt Bell

(57) ABSTRACT

A pole handling apparatus includes a T-shaped base mount with a connecting member pivotally attached thereto. A cradle member is attached to the connecting member, and two securing arms are pivotally attached to the cradle member. The cradle member is secured to the connecting member via a pin, with the cradle member including a base plate with a pair of attached sidewalls. A central aperture traverses the base plate such that the pin may extend through the base plate to join with the mounting cylinder. At least one of the sidewalls includes a recession to receive and support the fishing pole. To secure the fishing pole in the pole handling apparatus, the securing arms are initially in an open position, and the fishing pole is inserted into the recession of the sidewall. The securing arms will pivot from the open position to the closed position as the fishing pole is inserted into the recession. When in the closed position, the cradle and securing arms will enclose a portion of the fishing pole to prevent the removal of the fishing pole other than by a lifting force normal to the cradle.

17 Claims, 10 Drawing Sheets

FIG. 5

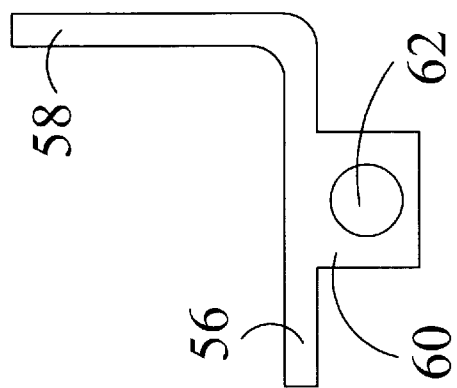
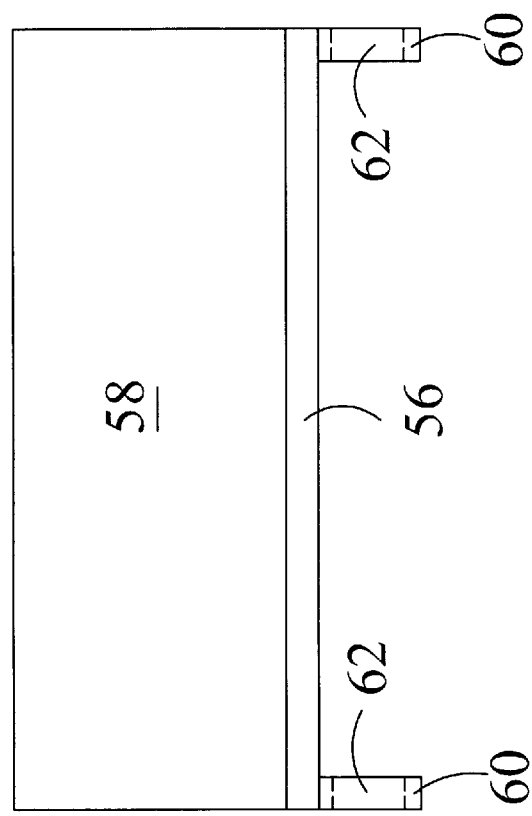

US 6,584,723 B2

POLE HANDLING APPARATUS

FIELD OF THE INVENTION

The present invention relates to an apparatus for securely holding a pole. More specifically, the present invention relates to an apparatus for engaging a fishing pole wherein the apparatus will resolutely hold the pole when a tangential force is applied to one end but will easily release the fishing pole when pulled upward by a user.

BACKGROUND OF THE INVENTION

Sport fishing, or angling, is a popular form of recreation throughout the world. Fishing equipment, or fishing tackle, generally includes a rod, a reel, fishing line, and a hook. There are various methods for fishing, with one popular method being that of still fishing or bottom fishing. This method requires the fisherman to attach the bait to the hook, and drop the hook and bait in a body of water, such as a river or pond. The fisherman thereby monitors the fishing pole waiting for a fish to attack the bait and become impaled on the hook, also referred to as setting the hook. It is a requirement that the fisherman constantly monitor the fishing pole to determine when a fish is biting the bait. Once the fish begins biting the bait, the fisherman will attempt to set the hook and pull the fish out of the water.

A person using this conventional fishing pole and line equipment frequently desires the use of both hands while fishing, although various circumstances commonly prevent the user from releasing the fishing pole. One such circumstance is that the fishing pole is not stable when out of the fisherman's hands, and may easily fall into the water. Adding to this problem is the circumstance when a fish is set on the hook, in which case the fish will frequently be large enough to be able tow an unsecured pole into the water. Moreover, other external forces, such as a wind force or the rocking of a boat due to waves, could cause the fishing pole to fall into the water. In any of these cases, the fisherman is required to either maintain a grip on the fishing pole or consistently monitor the fishing pole to prevent loss of the fishing pole.

SUMMARY OF THE INVENTION

It is an object of the present invention to provide a pole handling apparatus for holding a fishing pole.

It is a further object of the present invention to provide a pole handling apparatus that securely engages the fishing pole.

It is yet a further object of the present invention to provide a pole handling apparatus for engaging the fishing pole such that the user is not required to constantly monitor the status of the fishing pole.

It is an additional object of the present invention to provide a pole handling apparatus that allows the user to easily disengage the fishing pole from the fishing pole handling apparatus.

These and other objects of the present invention are accomplished by the pole handling apparatus of the present invention. The pole handling apparatus is designed to hold the fishing pole such that the fishing pole will be rigidly secured in place when a tangential force is applied to one end of the fishing pole (such as the force applied when a fish is caught on the hook), but the fishing pole will also be easily removable by the fisherman in a simple fashion. The pole handling apparatus is preferably attachable to a planar surface of a boat or pier, and includes various components to provide the desired stability for holding the fishing pole. The pole handling apparatus includes a T-shaped base mount with a connecting member pivotally attached thereto. A cradle member is further attached to the connecting member, and therefore supported by the connecting member and the base mount. A pair of L-shaped securing arms are additionally included, with the securing arms pivotally attached to the cradle member.

The cradle member is secured to the connecting member via a pin, with the cradle member including a base plate with a pair of sidewalls attached thereto, preferably on opposing sides. A central aperture traverses the base plate such that the pin may extend through the base plate to join with the mounting cylinder. The connection between the pin and the base plate is such that the cradle member may swivel about the axis where the pin joins the mounting cylinder. In addition, at least one of the sidewalls includes a recession, preferably semi-circular in shape, to receive and support the fishing pole. The recession is preferably located centrally in both sidewalls.

To secure a fishing pole in the pole handling apparatus, the securing arms are initially in an open position. While in the open position, the fishing pole is inserted into the recession of each sidewall. As the fishing pole is inserted into the recession, the securing arms, will pivot from the open position to the closed position. When in the closed position, the cradle and securing arms will enclose a portion of the fishing pole. When the securing arms engage one another, the fishing pole will be secured to prevent undesired removal of the fishing pole, while the fishing pole will be easily removed by the fisherman by applying a lifting force in the proper direction. More specifically, the position of the securing arms with respect to the fishing pole will prevent removal of the fishing pole. The fishing pole is positioned such that any force on the distal end of the fishing pole will cause the proximal end of the fishing pole to engage the edge of the securing arms. As a result, the force applied by the proximal end on the securing arms will not be sufficient to cause the securing arms to pivot. However, when the fishing pole is lifted away from the cradle member, the lifting force is distributed along the length of both securing arms. Consequently, the securing arms will be pivoted from the closed position to the open position, and the fisherman will be able to easily remove the fishing pole from the cradle member.

These and other objects, features, aspects and advantages of the present invention will become more apparent from the following detailed description of the present invention when taken in conjunction with the accompanying drawings.

BRIEF DESCRIPTION OF THE DRAWINGS

A pole handling apparatus incorporating the features of the present invention is depicted in the accompanying drawings which form portion of this disclosure and wherein:

FIG. 5 is an exploded view of the pole handling apparatus of the present invention as illustrated in FIG. 1;

FIG. 7a is a side elevational view of a securing arm of the pole handling apparatus of the present invention;

FIG. 7b is a front elevational view of a securing arm of the pole handling apparatus of the present invention;

DESCRIPTION OF THE PREFERRED EMBODIMENT

Figure 1:
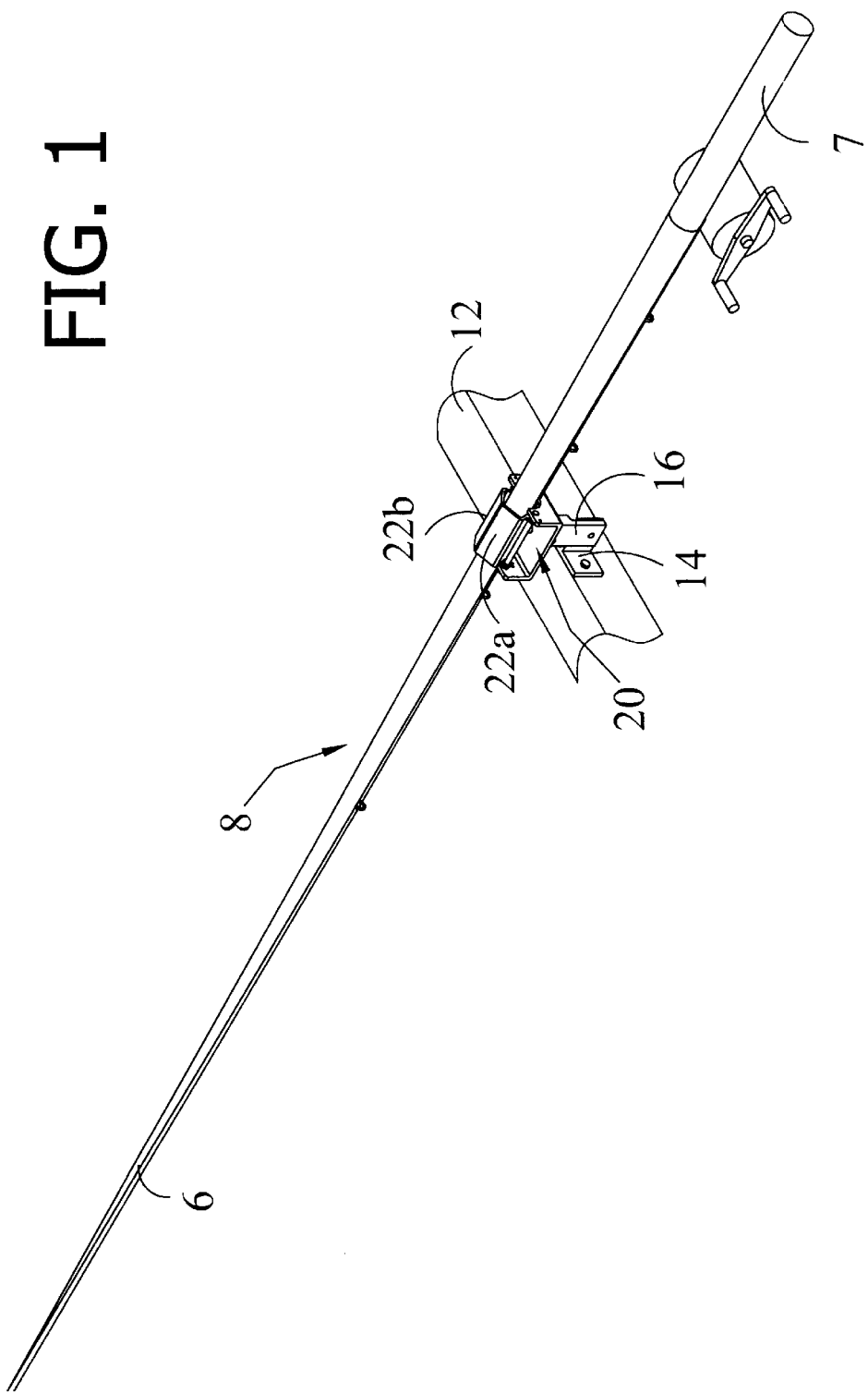
FIG. 1 is a perspective view of a preferred embodiment of the pole handling apparatus of the present invention, with the view illustrating a fishing pole secured within the pole handling apparatus.
Figure 2:
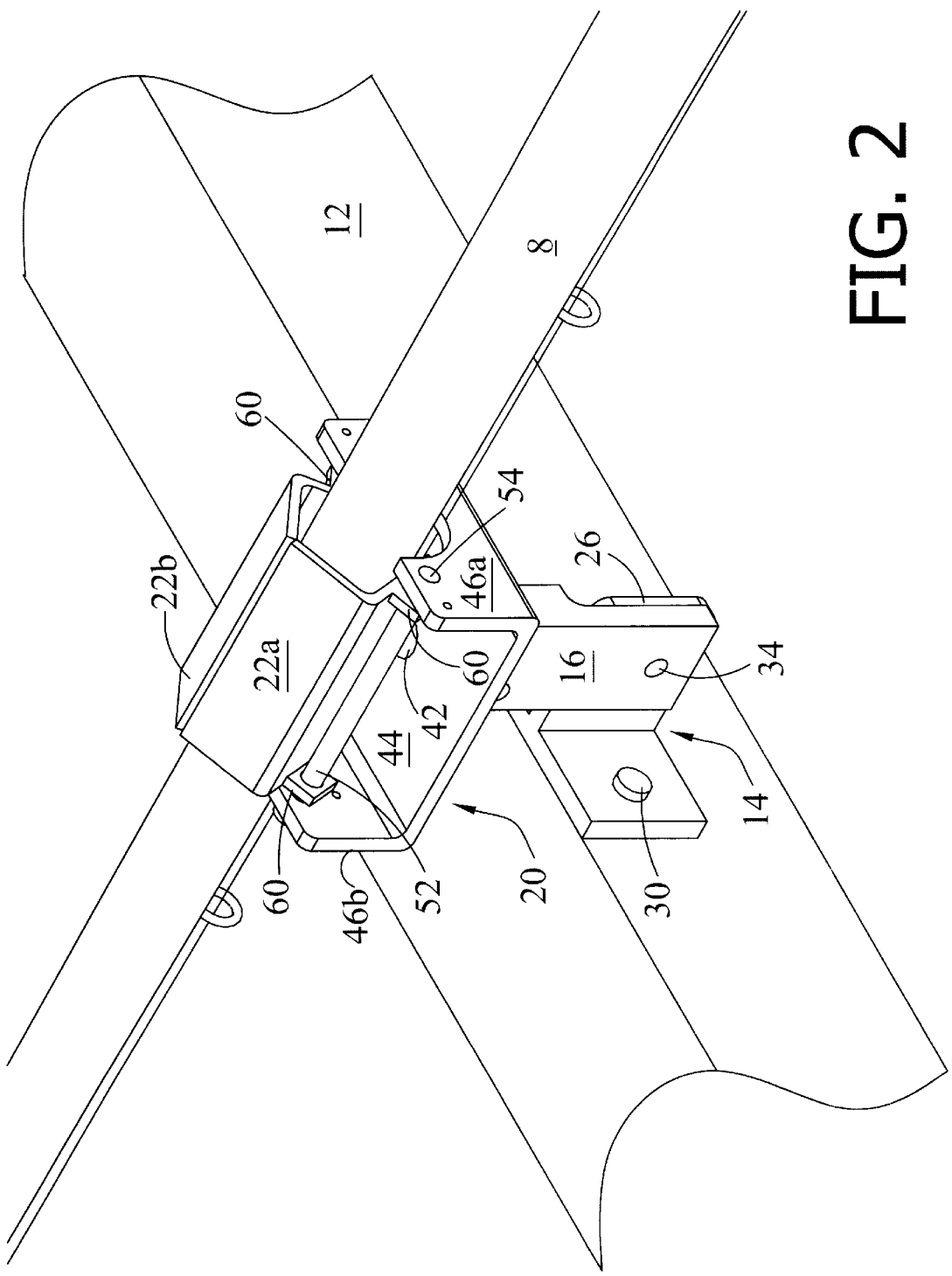
FIG. 2 is a enlarged perspective view of the pole handling apparatus as illustrated in FIG. 1, with a fishing pole secured within the pole handling apparatus.

Looking at FIGS. 1 and 2, a fishing pole 8 is illustrated as mounted in the preferred embodiment of the pole handling apparatus 10 of the present invention. The fishing pole 8 can be any one of multiple conventional designs having attached tackle, such as a reel, as described above. Looking at FIG. 1, the fishing pole 8 has a distal end 6 and a proximal end 7. The pole handling apparatus 10 is designed to hold the fishing pole 8 such that the fishing pole 8 will be rigidly secured when a force is applied to the distal end 6 of the fishing pole (such as the force applied by a fish when the fish is caught on the hook (not illustrated)), but the fishing pole 8 will also be easily removable from the pole handling apparatus 10 by the user in a simple fashion when a lifting force normal to the pole handling apparatus 10 is applied. Consequently, the present invention allows the user or other user to fish without requiring continuous monitoring and handling of the fishing pole 8.

Continuing to look at FIG. 2, the preferred embodiment of the pole handling apparatus 10 of the present invention is attachable to a planar surface 12 of a boat, pier, or other entity having a substantially flat surface. Looking to FIGS. 3 through 5, the pole handling apparatus 10 includes various components to provide the desired stability for holding the fishing pole 8. The pole handling apparatus 10 comprises a T-shaped base mount 14 with a connecting member 16 pivotally attached thereto. A cradle member 20 is further attached to the connecting member 16, and therefore the connecting member 16 and the base mount 14 serve as support members for the cradle member 20. A pair of L-shaped securing arms 22a, 22b are further included in the present design, with the securing arms 22a, 22b pivotally attached to the cradle member 20.

Figure 5:
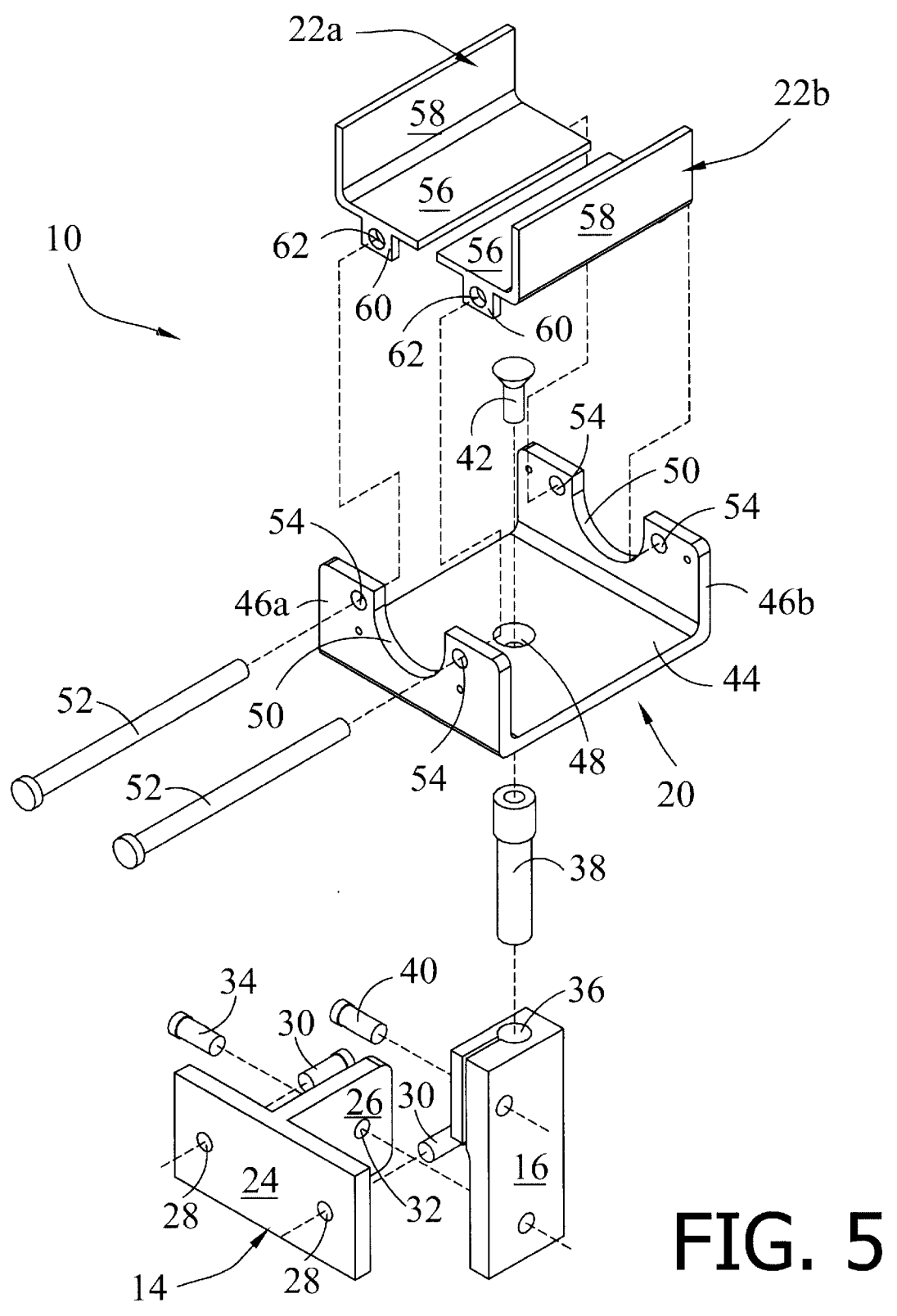

Continuing to examine FIG. 5, the exploded view of the pole handling apparatus 10 illustrates the assembly of the present invention. Initially, the T-shaped base mount 14 includes a foundation plate 24 and a support cantilever 26 perpendicularly attached to the foundation plate 24. A pair of foundation apertures 28 traverse the foundation plate 24, through which a screw 30 or similar means for engagement may pass through to secure the base mount 14 to the planar surface 12 (see FIG. 2). Consequently, the support cantilever 26 is normal to the planar surface 14. The support cantilever 26 additionally includes a central aperture 32 through which a bolt 34 or other means for engagement passes through to join the connecting member 16 with the base mount 14. The connecting member 16 is pivotal about the bolt 34 such that it can be angularly displaced as desired by the user, as discussed in greater detail herein. The connecting member 16 additionally includes a cavity 36 for receiving a mounting cylinder 38. The mounting cylinder 38 substantially traverses the cavity 36, and a securing member 40 is used to engage the connecting member 16 to secure the mounting cylinder 38 within the surrounding connecting member 16.

Continuing to look at FIG. 5, the cradle member 20 is then secured to the mounting cylinder 38 (and thus connecting member 16) via a pin 42. The cradle member 20, the components of which are illustrated in FIGS. 6a through 6d, includes a base plate 44 with a pair of sidewalls 46a, 46b attached to the base plate 44 on opposing sides. A central aperture 48 traverses the base plate 44 (see FIG. 6a) such that the pin 42 may extend through the base plate 44 to join with the mounting cylinder 38. The connection between the pin 42 and the base plate 44 is such that the cradle member 20 may swivel about the axis where the pin 42 joins the mounting cylinder 38. In addition, at least one of the sidewalls 46a, 46b includes a recession 50, preferably semi-circular in shape, to receive and support the fishing pole 8 (see FIG. 2). The recession 50 is preferably located centrally in both sidewalls 46a, 46b. The cradle member 20 is preferably made of a strong and rigid material to withstand any force applied thereto, such as aluminum.

Looking at FIGS. 7a and 7b, each securing arm 22a, 22b is substantially L-shaped, and includes a pivoting plate 56 perpendicularly joined to a locking plate 58. A tab 60 extends from the pivoting plate 56, with a joining aperture 62 extending through the tab 60. Looking at FIG. 5, the securing arms 40a, 40b are thereby connected to the cradle member 20 between the sidewalls 46a, 46b using a pair of support shafts 52 that extend through apertures 54 in the sidewalls 46a, 46b and the joining apertures 62 in the tabs 60. As a result, the securing arms 22a, 22b are pivotable about the support shafts 52 to be able to secure the fishing pole 8 in the cradle member 20.

Referring back to FIGS. 3 and 4, the securing arms 22a, 22b are pivotable between an open position (see FIG. 3) and a locked position (see FIG. 4). In the open position, the pivoting plate 56 of securing arm 22a is substantially in line with the pivoting plate 56 of securing arm 22b, and the locking plate 58 of securing arm 22a is substantially parallel to the locking plate 58 of securing arm 22b. In the closed position, the securing arms 22a, 22b are pivoted such that the pivoting plate 56 of securing arm 22a is skewed with respect to the pivoting plate 56 of securing arm 22b, and the locking plate 58 of securing arm 22a contacts the locking plate 58 of securing arm 22b.

Figure 4:
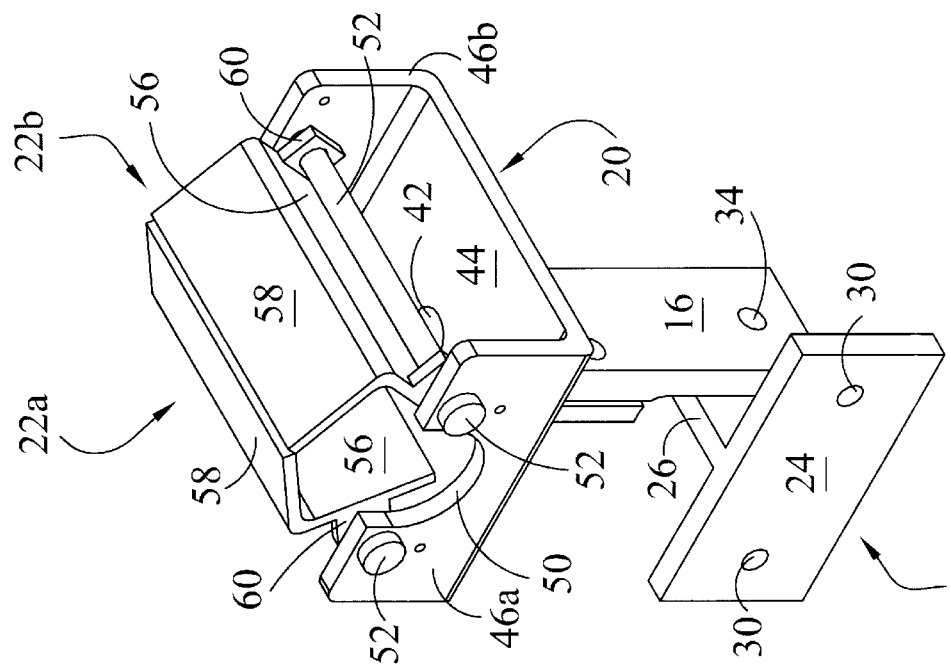
FIG. 4 is a perspective view of the pole handling apparatus of the present invention as illustrated in FIG. 1, with the securing arms in a locked position.
Figure 3:
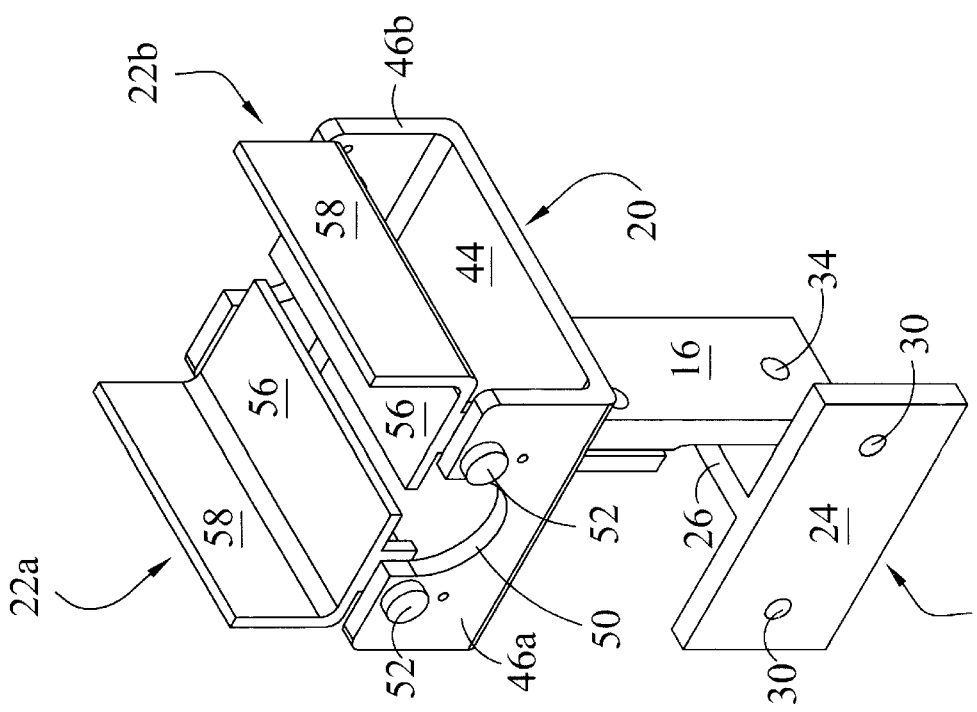
FIG. 3 is a perspective view of the pole handling apparatus of the present invention as illustrated in FIG. 1, with the securing arms in an open position.
Figure 6A:
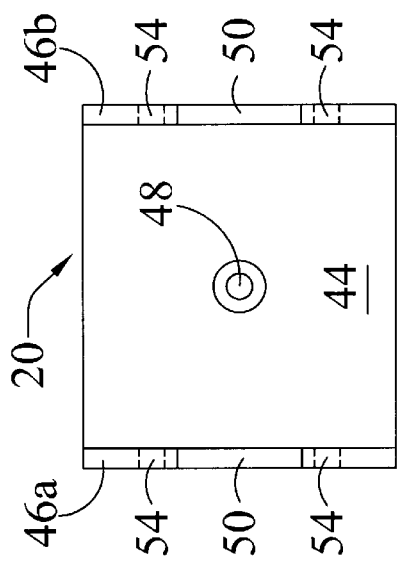
FIG. 6a is a top plan view of the cradle member of the pole handling apparatus of the present invention.
Figure 6B:
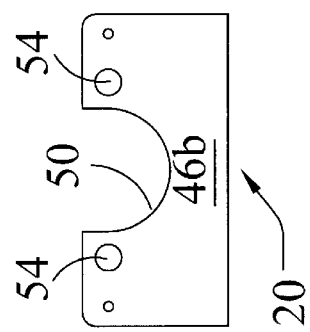
FIG. 6b is a side elevational view of the cradle member of the pole handling apparatus of the present invention.
Figure 6C:
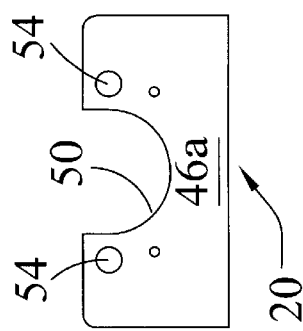
FIG. 6c is a front elevational view of the cradle member of the pole handling apparatus of the present invention.
Figure 6D:
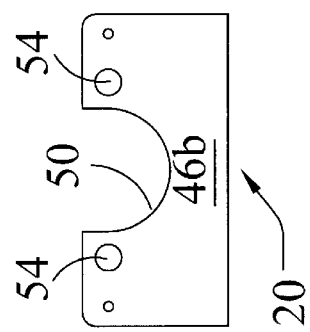
FIG. 6d is a rear elevational view of the cradle member of the pole handling apparatus of the present invention.

To secure a fishing pole 8 in the pole handling apparatus 10, the securing arms 22a, 22b are initially in the open position as illustrated in FIG. 3. While in the open position, the fishing pole 8 is inserted into the recession 50 of each sidewall 46a, 46b (see FIG. 2). As the fishing pole 8 is inserted into the recession 50, the securing arms 22a, 22b, will pivot from the open position (FIG. 3) to the closed position (FIG. 4). When in the closed position, the cradle member 20 and securing arms 22a, 22b will enclose a portion of the fishing pole 8 (see FIG. 1). When the securing arms 22a, 22b engage one another, the fishing pole 8 will be secured in the cradle member 20 to prevent the undesired removal of the fishing pole 8, while the fishing pole 8 will be easily removed by the user by applying a lifting force in a direction normal to the cradle member 20.

More specifically, the position of the securing arms 22a, 22b with respect to the fishing pole 8 prevents undesired removal of the fishing pole 8 from the pole handling apparatus 10. Looking at FIG. 2, the fishing pole 8 is positioned such that any initial force A on the distal end 6 of the fishing pole 8 will cause an opposing force B at the proximal end 7 of the fishing pole 8. The opposing force B will therefore be specifically directed to the edge of the securing arms 22a, 22b such that forces A and B will have to be robust (greater than that provided by a fish or wind) to pivot and separate the securing arms 22a, 22b. As a result, the typical force applied by the proximal end 7 on the securing arms 22a, 22b will not be sufficient to cause the securing arms 22a, 22b to pivot. However, when a lifting force C (perpendicular to the cradle member 20) is applied to the fishing pole 8, such that the lifting force C is distributed along the length of the securing arms 22a, 22b, the fishing pole 8 will easily be lifted away from the cradle member 20. Consequently, the securing arms 22a, 22b will be pivoted from the closed position to the open position, and the user will be able to straightforwardly lift and remove the fishing pole 8 from the cradle member 20.

It should again be noted that the connecting member 16 is pivotally connected to the base mount 14 such that the connecting member 16 can be rotated with respect to the base mount 14. Such an assembly allows the user to maneuver the connecting member 16 to the position desired for the most secure handling of the fishing pole 8. Additionally, the cradle member 20 is rotatably coupled to the mounting cylinder 38 such that the cradle member 20 may be rotated to the position desired by the user using the pole handling apparatus 10, such that the user can redirect the alignment of the fishing pole 8 being supported by the pole handling apparatus 10 without requiring reattachment to the supporting planar surface 12.

Figure 8:
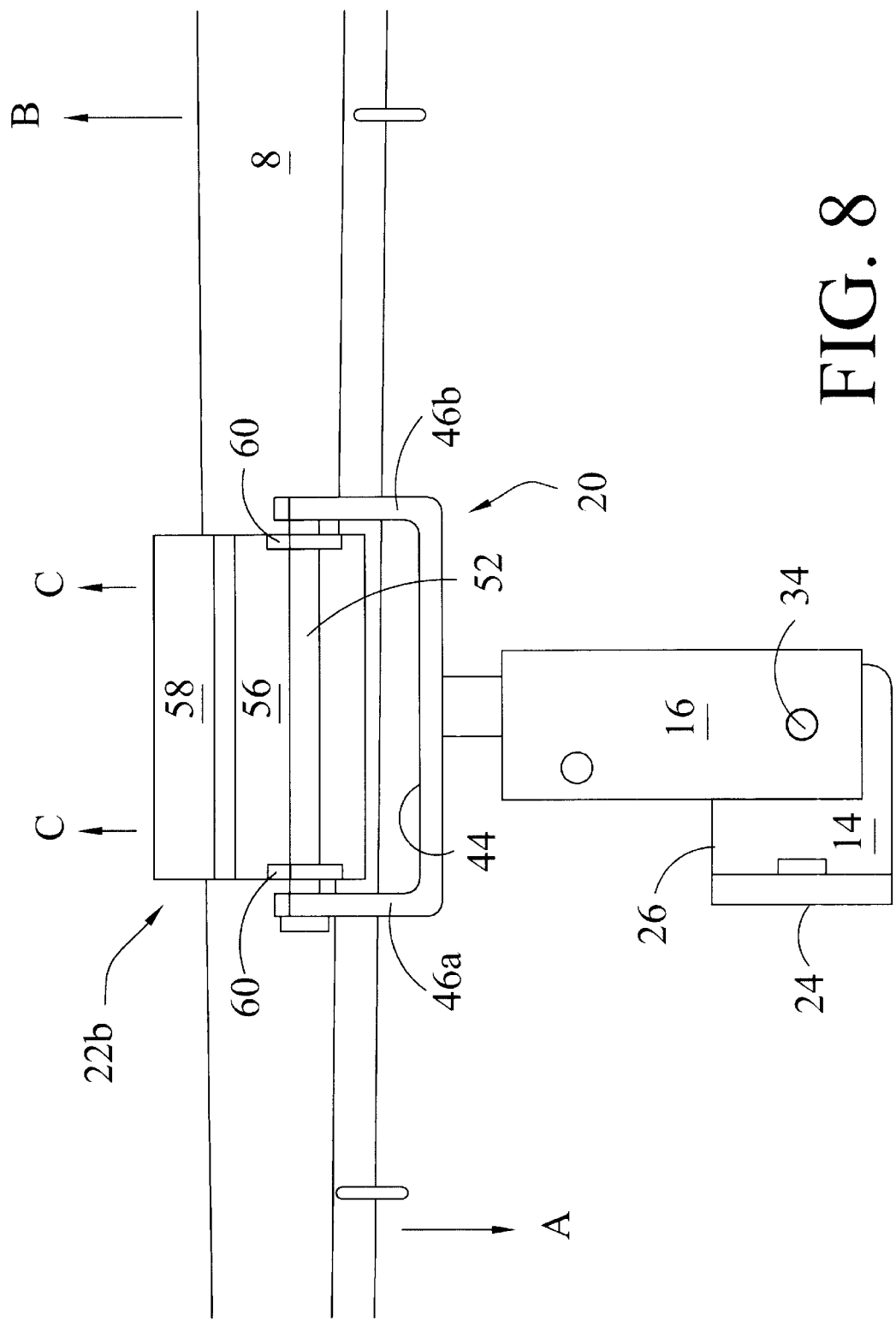
FIG. 8 is a side elevational view of the pole handling apparatus as illustrated in FIG. 1, with a fishing pole secured within the pole handling apparatus.
Figure 9:
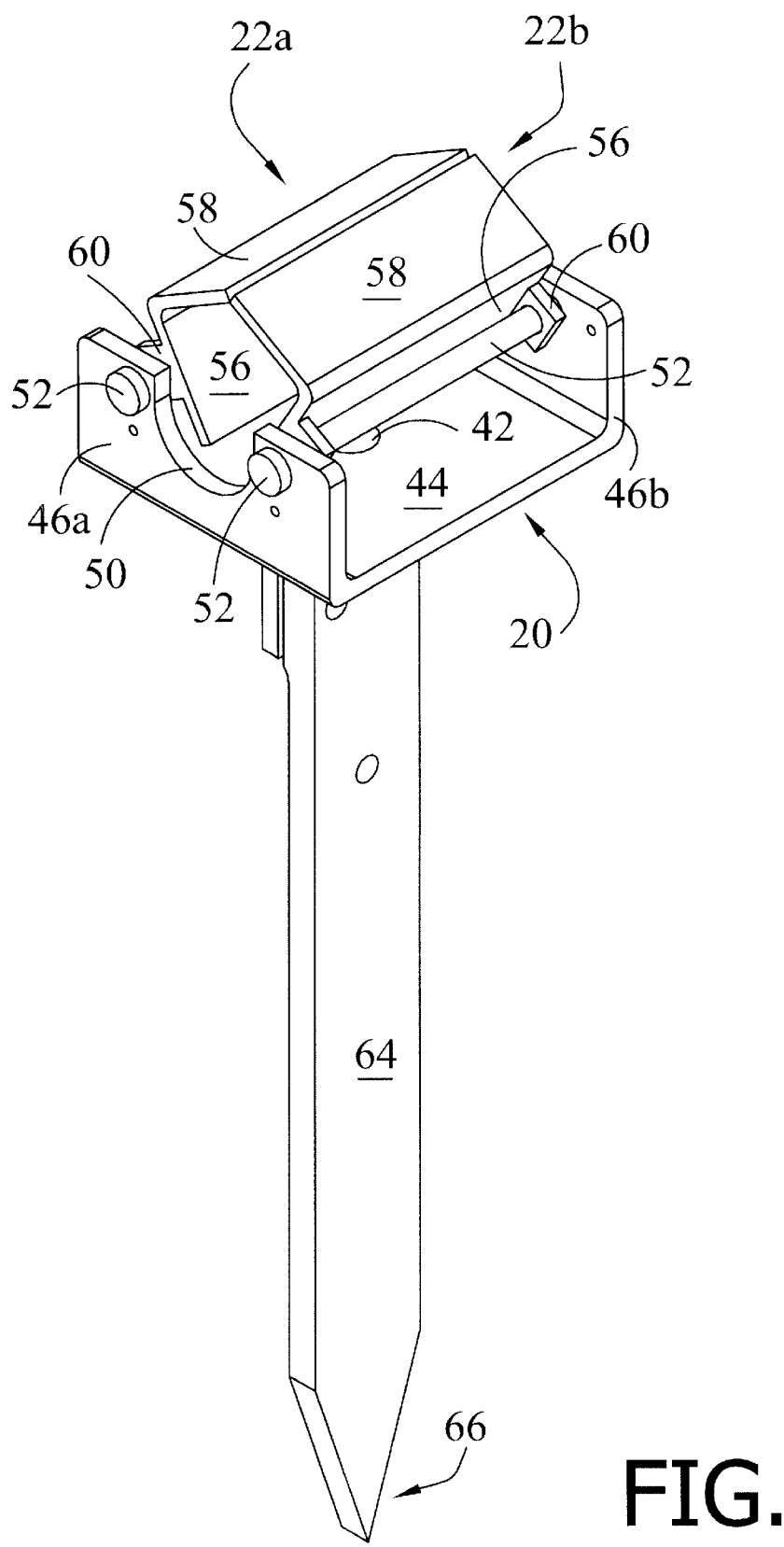
FIG. 9 is a perspective view of a second embodiment of the pole handling apparatus of the present invention.

Looking to FIG. 9, a second embodiment of the pole handling apparatus 10 provides a means for securing the fishing pole 8 when the user is on the shore rather than on a boat or pier. In this embodiment, the support members comprising the base mount 14 and connecting member 16 are replaced with a stake member 64 (compare FIG. 1 with FIG. 8), with the stake member 64 having a distal end 66 that preferably converges to a sharp edge or point. Consequently, the user will be able to drive the stake member 16 into a shore surface such that the stake member 64 will be firmly mounted in such surface, thereby further providing a stable platform for the pole handling apparatus 10. As with the previous embodiment, the cradle member 20 can be attached to the stake member 64, such that the cradle member 20 and the remaining elements of the pole handling apparatus 10 will be able to securely engage the fishing pole 8 as described above.

Figure 11:
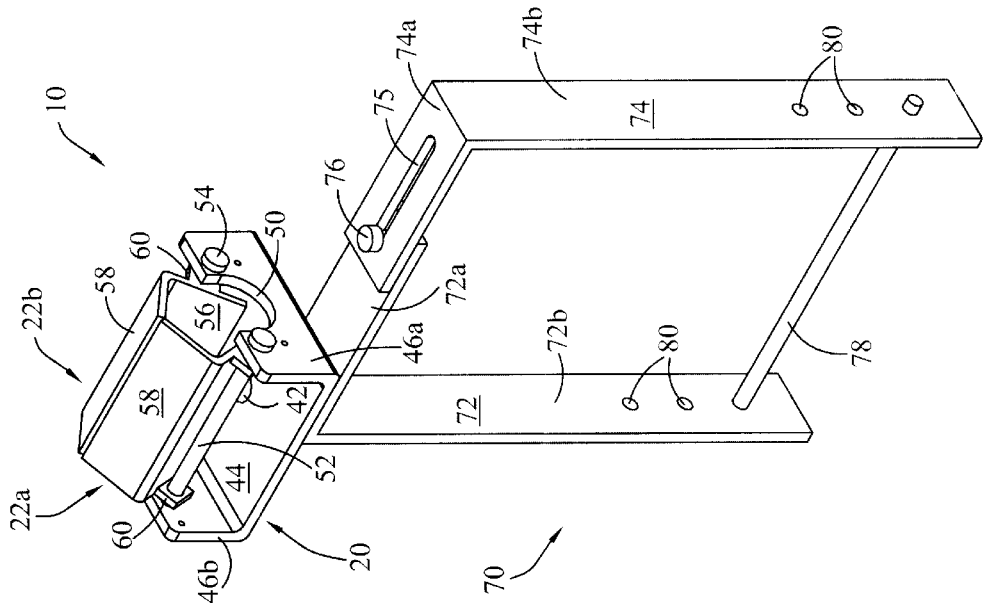
FIG. 11 is a side elevational view of the embodiment of the pole handling apparatus illustrated in FIG. 10.
Figure 10:
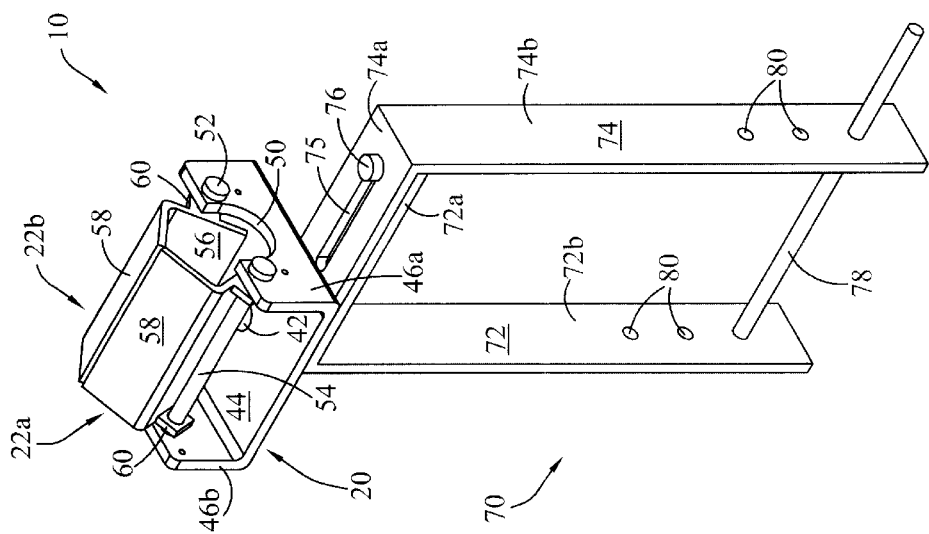
FIG. 10 is a perspective view of an additional embodiment of the pole handling apparatus of the present invention.
Figure 12:
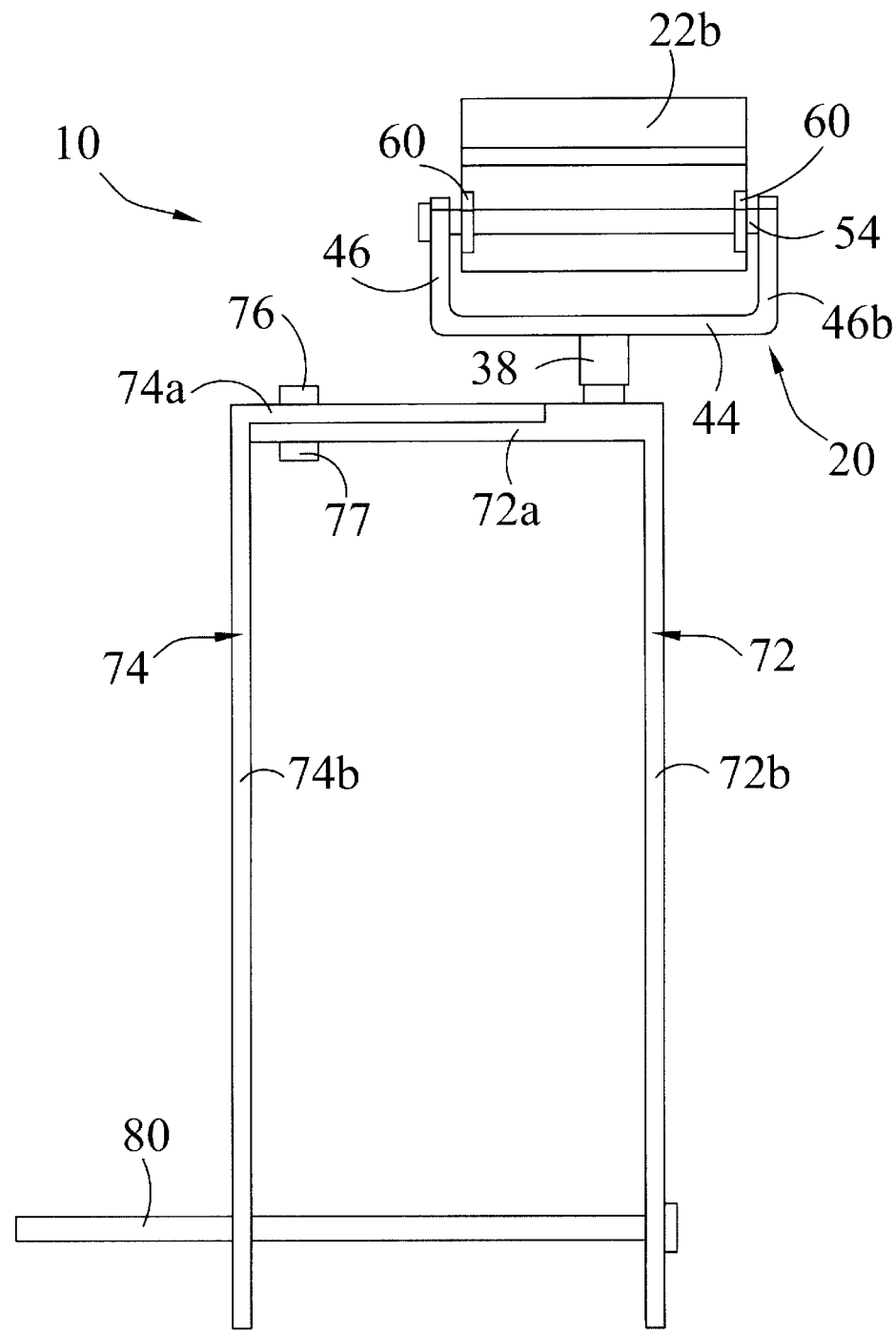
FIG. 12 is a front elevational view of the embodiment of the pole handling apparatus illustrated in FIG. 11.

Looking to FIGS. 10 through 12, an additional embodiment of the pole handling apparatus 10 is illustrated, with this embodiment providing a means for securing the fishing pole 8 to a horizontal rail or similar beam (not illustrated), such as the rails found on bridges. In this embodiment, the support members comprising the base mount 14 and connecting member 16 of FIG. 3 are replaced with a straddling member 70 (compare FIG. 1 with FIG. 10) that is substantially U-shaped to be able to surround and be secured to the horizontal beam. The straddling member 70 includes a first support arm 72 and a second support arm 74, with each support arms 72, 74 preferably being inverted L-shaped members. Looking at FIG. 12, the first support arm 72 includes a horizontal arm 72a and a vertical arm 72b, while the second support arm 74 includes a horizontal arm 74a and a vertical arm 74b. Looking at FIGS. 10 and 11, an elliptical aperture 75 traverses the horizontal arm 72a of first support arm 72. As a result, a bolt 76 or other connecting member may traverse the elliptical aperture 75 of the first support arm 72 to engage the second support arm 74 and a nut 77 (see FIG. 12), thereby joining the support arms 72, 74. Furthermore, the position of the bolt 76 may be varied in the elliptical aperture 75 of the first support arm 74, thereby allowing the user to vary the distance between the vertical arms 72b, 74b (see FIG. 11) of the support arms 72, 74. As a result, the user is able to alter the width of the straddling member 70 according to the size of the horizontal rail to which the straddling member 70 is to be attached.

Continuing to look at FIGS. 10 and 12, the cradle member 20 will be attached to the second vertical arm 72b of the straddling member 70 using the mounting cylinder 38, as provided in the first embodiment. As a result, the cradle member 20 and the remaining elements of the pole handling apparatus 10 will be able to securely engage the fishing pole 8 as described above. It should additionally be noted that a connecting rod 78 is included with the straddling member 70, with the connecting rod 78 able to pass through a series of locking apertures 80 that traverse each vertical arm 72b, 74b. The connecting rod 78 therefore further reinforces the connection of the straddling member 70b with the horizontal beam.

Thus, although there have been described particular embodiments of the present invention of a new and useful POLE HANDLING APPARATUS, it is not intended that such references be construed as limitations upon the scope of this invention except as set forth in the following claims.

What is claimed is:

1. A method for securely holding a pole comprising the steps of:
   a) providing a pole handling apparatus comprising a cradle member and a first securing arm and a second securing arm pivotally connected to said pole handling apparatus, each pivotally attached to the cradle member, the first securing arm and the second securing arm pivoting in opposing directions, and pivoting in such a manner that planar portions of the first securing arm and the second securing arm contact one another in a closed position, said first and second securing arms each being substantially L-shaped, wherein said first securing arm includes a first substantially planar pivoting plate coupled to a first substantially planar locking plate such that said first substantially planar pivoting plate is substantially perpendicular to said first substantially planar locking plate, and wherein said second securing arm includes a second substantially planar pivoting plate coupled to a second substantially planar locking plate such that said second substantially planar pivoting plate is substantially perpendicular to said second substantially planar locking plate;
   b) pivoting said securing arms to an open position wherein said first substantially planar pivoting plate is substantially in line with said second substantially planar pivoting plate;
   c) engaging said first and second substantially planar pivoting plates with a pole; and d) rotating said securing arms such that said first substantially planar locking plate engages said second substantially planar locking plate.

2. A pole handling apparatus for securely engaging a fishing pole, said pole handling apparatus comprising:
- a cradle member;
- a first securing arm and a second securing arm, each pivotally attached to said cradle member, said first securing arm and said second securing arm pivoting in opposing directions, said first securing arm and said second securing arm each having substantially planar portions and pivoting in such a manner that the planar portions contact one another in a closed position; and
- support means for holding said cradle member, said cradle member pivotally attached to said support means,
- wherein said first and second securing arms are each substantially L-shaped each portion of the L-shapes first and second securing arms being substantially planar.

3. The pole handling apparatus as described in claim 2, wherein said support means comprises:
- a base mount; and
- a connecting member attached to said base mount, wherein said cradle member is attached to said connecting member.

4. The pole handling apparatus as described in claim 3, wherein said base mount comprises:
- a foundation plate; and
- a support cantilever connected to said foundation plate, said connecting member attached to said support cantilever.

5. The pole handling apparatus as described in claim 2, wherein said cradle member comprises:
- a base plate coupled to said connecting member; and
- a pair of sidewalls attached to said base plate, wherein said first and second securing arms are connected between said sidewalls.

6. The pole handling apparatus as described in claim 5, wherein one of said sidewalls further includes a recession to receive the fishing pole.

7. The pole handling apparatus as described in claim 2, wherein said first and second securing arms each include a substantially planar pivoting plate connected to a substantially planar locking plate, wherein said substantially planar pivoting plate is substantially perpendicular to said substantially planar locking plate.

8. The pole handling apparatus as described in claim 7, wherein said first and second securing arms are pivotable between an open position and a closed position.

9. The pole handling apparatus as described in claim 2, wherein said support means comprises a stake member.

10. The pole handling apparatus as described in claim 2, wherein said support means comprises a straddling member, said straddling member comprising a first inverted L-shaped arm joined with a second inverted L-shaped arm, wherein said cradle member is attached to said second inverted L-shaped arm.

11. A pole handling assembly for securely engaging a pole, said pole handling assembly comprising:
- a support member;
- a cradle member connected to said support member; and
- a pair of securing arms pivotally attached to said cradle member, said securing arms pivotable between an open position and a closed position,
- wherein said pair of securing arms comprises a first securing arm and second securing arm, each pivotally attached to said cradle member, said first securing arm and said second securing arm pivoting in opposing directions, said first securing arm and said second securing arm each having substantially planar portions and pivoting in such a manner that the planar portions contact one another in a closed position,
- wherein said first securing arm includes a first substantially planar pivoting plate connected to a first substantially planar locking plate;
- wherein said second securing arm includes a second substantially planar pivoting plate connected to a second substantially planar locking plate;
- wherein said first substantially planar pivoting plate is substantially normal to said first substantially planar locking plate; and
- wherein said second substantially planar pivoting plate is substantially normal to said second substantially planar locking plate.

12. The pole handling apparatus as described in claim 11, wherein said cradle member comprises:
- a base plate connected to said support member; and
- a least one brace attached to said base plate, said first and second securing arms pivotally connected to said at least o~e brace.

13. The pole handling apparatus as described in claim 11, wherein said first and second securing arms are each substantially L-shaped.

14. The pole handling apparatus as described in claim 11, wherein said first and second securing arms are pivotable between an open position and a closed position;
- wherein said first substantially planar locking plate is substantially parallel with said second substantially planar locking plate in said open position; and
- wherein said first substantially planar locking plate contacts said second substantially planar locking plate in said closed position.

15. The pole handling apparatus as described in claim 11, wherein said support member comprises:
- a base mount; and
- a connecting member attached to said base mount, wherein said cradle member is attached to said connecting member.

16. The pole handling apparatus as described in claim 11, wherein said support member comprises a stake member, wherein said cradle member is attached to said stake member.

17. The pole handling apparatus as described in claim 11, wherein said support member comprises a straddling member, said straddling member comprising a first inverted L-shaped arm joined with a second inverted L-shaped arm, wherein said cradle member is attached to said second inverted L-shaped arm.

\* \* \* \* \*